June 22, 1965  T. HUTSON, JR  3,190,935
PURIFICATION PROCESS
Filed Dec. 11, 1961  2 Sheets-Sheet 1

INVENTOR.
THOMAS HUTSON, JR.
BY Young & Quigg
ATTORNEYS

United States Patent Office 3,190,935
Patented June 22, 1965

3,190,935
PURIFICATION PROCESS
Thomas Hutson, Jr., Bartlesville, Okla., assignor to Phillips Petroleum Company, a corporation of Delaware
Filed Dec. 11, 1961, Ser. No. 158,233
3 Claims. (Cl. 260—676)

This invention relates to a method for purifying normal paraffin hydrocarbons and more particularly to a method for removing organic fluorides from same. In one aspect, this invention relates to a method for removing organic fluorides while simultaneously carrying out a hydrofluoric acid alkylation process. In another aspect this invention relates to the treatment of hydrocarbon materials with hydrofluoric acid so as to remove undesirable constituents from same. A further aspect of this invention relates to a method for treating saturated organic compounds to remove undesirable organic fluorine compounds therefrom by treating such compounds with hydrofluoric acid.

In the manufacture of hydrocarbons by processes in which fluorine-containing catalysts are used, small proportions of organic fluorine-containing by-products are formed. These processes may involve reactions such as polymerization and alkylation of relatively low-boiling hydrocarbons into high-boiling hydrocarbons in the presence of catalyst comprising one or more of such fluorine compounds as hydrofluoric acid, boron trifluoride, and the like. Polymerization yields a product that may be hydrogenated into saturated hydrocarbons in a subsequent hydrogenation step; alkylation yields a product comprised predominantly or entirely of saturated hydrocarbons. Although the exact nature or composition of the fluorine-containing by-products has not been definitely established, they are believed to be predominantly alkyl-fluorides. They are not completely removed by washing the hydrocarbons with alkali solutions. They tend to decompose at elevated temperatures, such as those employed in fractional distillation of the hydrocarbons, thereby forming hydrofluoric acid, which is corrosive, especially in the presence of moisture. In addition, such compounds upon storage tend to build up the organic fluoride content therein and thus for many purpose become "off-specification."

Thus it is an object of this invention to purify hydrocarbon materials.

Another object of this invention is to remove non-paraffinic impurities from hydrocarbon materials.

A still further object of this invention is to remove organic fluorides from off-specification hydrocarbon material while simultaneously manufacturing higher-boiling hydrocarbons.

Other aspects, objects and the several advantages of the invention are apparent from a study of the disclosure, the drawings and the appended claims.

According to this invention, I have now found that removal of organic fluoride impurities in "off-specification" organic systems, particularly normal butane and/or propane, can be accomplished by introducing the off-specification material as part of the feed stream of a HF alkylation reactor while simultaneously operating the reactor to alkylate the remainder of the feed stream therein. More specifically, in accordance with this invention I have found that since propane and normal butane do not readily alkylate with propylene, butylene or amylene, these materials when containing undesirable amounts of organic fluoride can be processed through a motor fuel alkylation unit along with the usual feed stock so as to return same to their ultimately desired properties.

Figure 1:
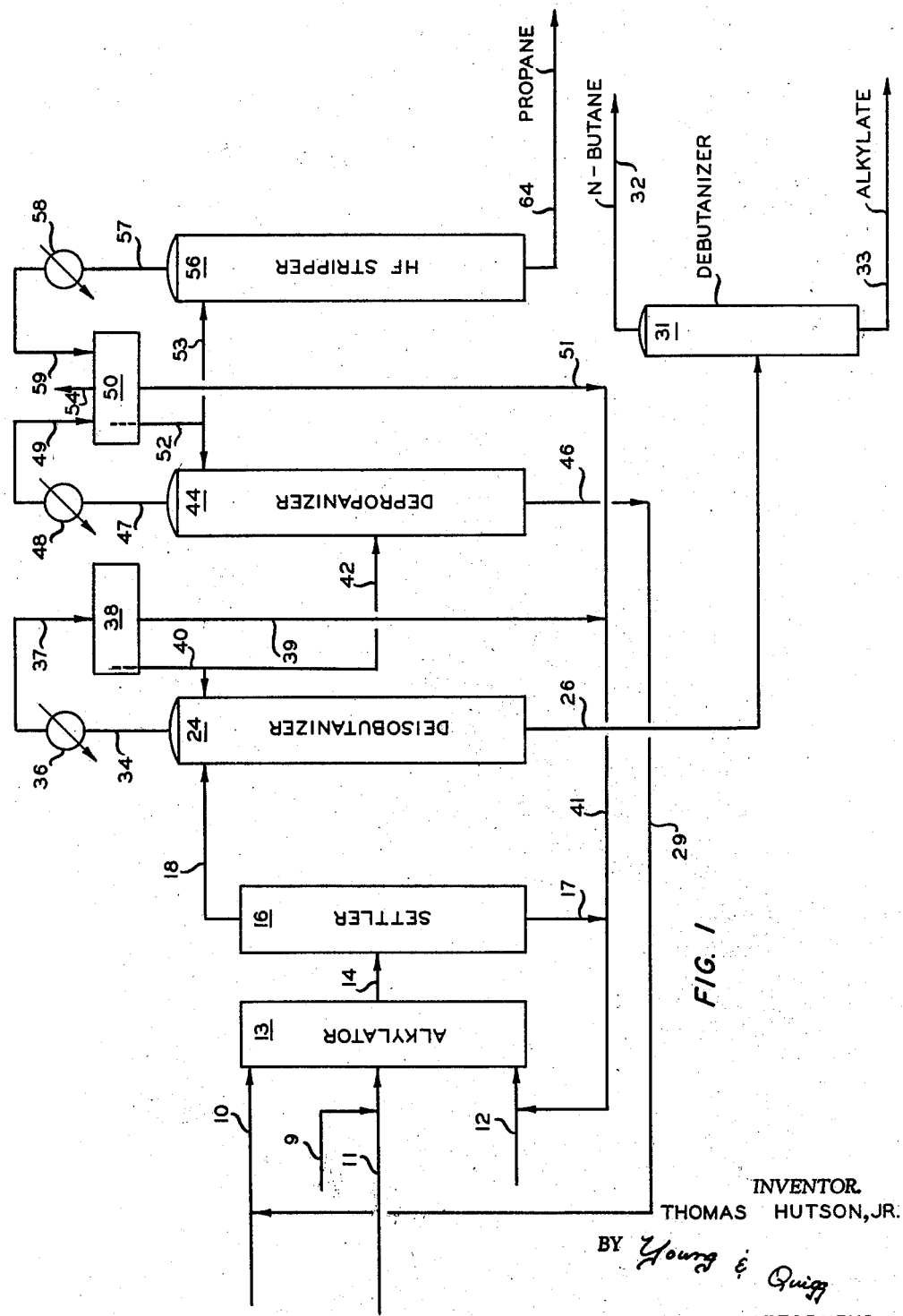
FIGURE 1 is a diagrammatic view of the process of this invention.

Referring now to FIGURE 1 which shows an alkylation process in which my invention can be used, isobutane is fed by way of conduit 10, olefin fed by way of conduit 11, "off-specification" hydrocarbons such as propane is fed by way of conduit 9, and hydrofluoric acid by conduit 12 to alkylator 13 wherein these feed materials will comingle under alkylation conditions thus obtaining the desired alkylated products and purified hydrocarbon. The conditions of temperature, pressure and reaction time as well as the ratios of isobutane to olefin and of hydrocarbons to acid are well known in the art.

Although these conditions do not form a part of the present invention, for exemplary purposes suitable conditions are set forth as follows: temperature, 90 to 115° F.; pressure, 80 to 175 pounds per square inch gauge; average reaction time, in the order of about 0.5 to 15 minutes. Vigorous agitation is maintained to insure initimate contact between the acid and the hydrocarbon phases. The ratio of isobutane to alkylating agent or olefin can be about 12:1 parts by weight and the acid to hydrocarbon ratio can be about 4:1 parts by weight. The resulting effluent mixture from alkylator 13 is passed by way of conduit 14 to a settler 16 in which the mixture is separated into an acid phase and a hydrocarbon phase. The acid phase is recycled by way of conduit 17 to conduit 12 and back to the alkylator with the fresh acid feed. The hydrocarbon phase is passed from settler 16 by way of conduit 18 into the deisobutanizer 24 in which isobutane and lighter materials are separated therefrom. These materials are passed by way of conduit 34 to the separator 38. From the bottom of the deisobutanizer 24 the higher-boiling product is withdrawn through conduit 26 and passed to debutanizer 31 from which the overhead product is normal butane in conduit 32 and the bottoms product in conduit 33 is the debutanized alkylate product. This alkylate product can then be passed to further processing steps which are well known to those skilled in the art.

The overhead from deisobutanizer 24 contains iso-butane, hydrogen fluoride, propane and gases lighter than propane. This overhead passes through conduit 34 to cooler condenser 36. The condensed stream flows through conduit 37 to accumulator 38. In accumulator 38 another phase separation occurs forming an acid phase and a hydrocarbon phase. Hydrogen fluoride from the acid phase is removed through conduit 39 and returned by way of conduit 41 to conduit 12 where it is passed with fresh acid to reactor 13. Reflux from deisobutanizer 24 is provided from the hydrocarbon phase in accumulator 38 passing to the deisobutanizer by way of conduit 40. Production quantities of hydrocarbon, still containing dissolved hydrogen fluoride, are passed through conduit 42 to depropanizer 44.

Isobutane is removed from the hydrocarbon stream in the depropanizer, withdrawn through conduit 46 and recycled by way of conduit 29 to conduit 10 and then to alkylator 13. The overhead in depropanizer 44 passes by way of conduit 47, cooler condenser 48, and conduit 49 to accumulator 50 in which another phase separation occurs. An acid phase is formed and recycled through conduits 51, 41 and 12 to alkylator 13, and the hydrocarbon phase is formed and used as reflux, passing through line 52 to depropanizer 44. Production quantities of hydrocarbon, predominantly propane and/or normal butane depending upon makeup of the initial feedstocks and containing some dissolved hydrogen fluoride and some isobutane, are passed through line 53 to hydrogen fluoride stripper 56. When ethane is present in the feed material to the alkylator, this ethane will also be present in the feed to the hydrogen fluoride stripper 56. A liquid hydrocarbons and acid mixture is passed downwardly through the stripping column and rising vapor from the reboiling section strips substantially all of the hydrogen fluoride from the hydrocarbon. Vapors of hydrogen fluoride, propane and ethane pass overhead to conduit 57, cooler condenser 58 and conduit 59 into reflux accumulator 50. Here the phase separation occurs that was previously described, the acid being recycled to the alkylator and the hydrocarbon passed with the feed stream to the stripping column 56 as feed. Ethane and other non-condensibles would be removed through conduit 54 as needed.

This bottoms product is predominantly propane but contains any other hydrocarbons such as normal butane, which are present in the initial feed to the stripping column.

Figure 2:
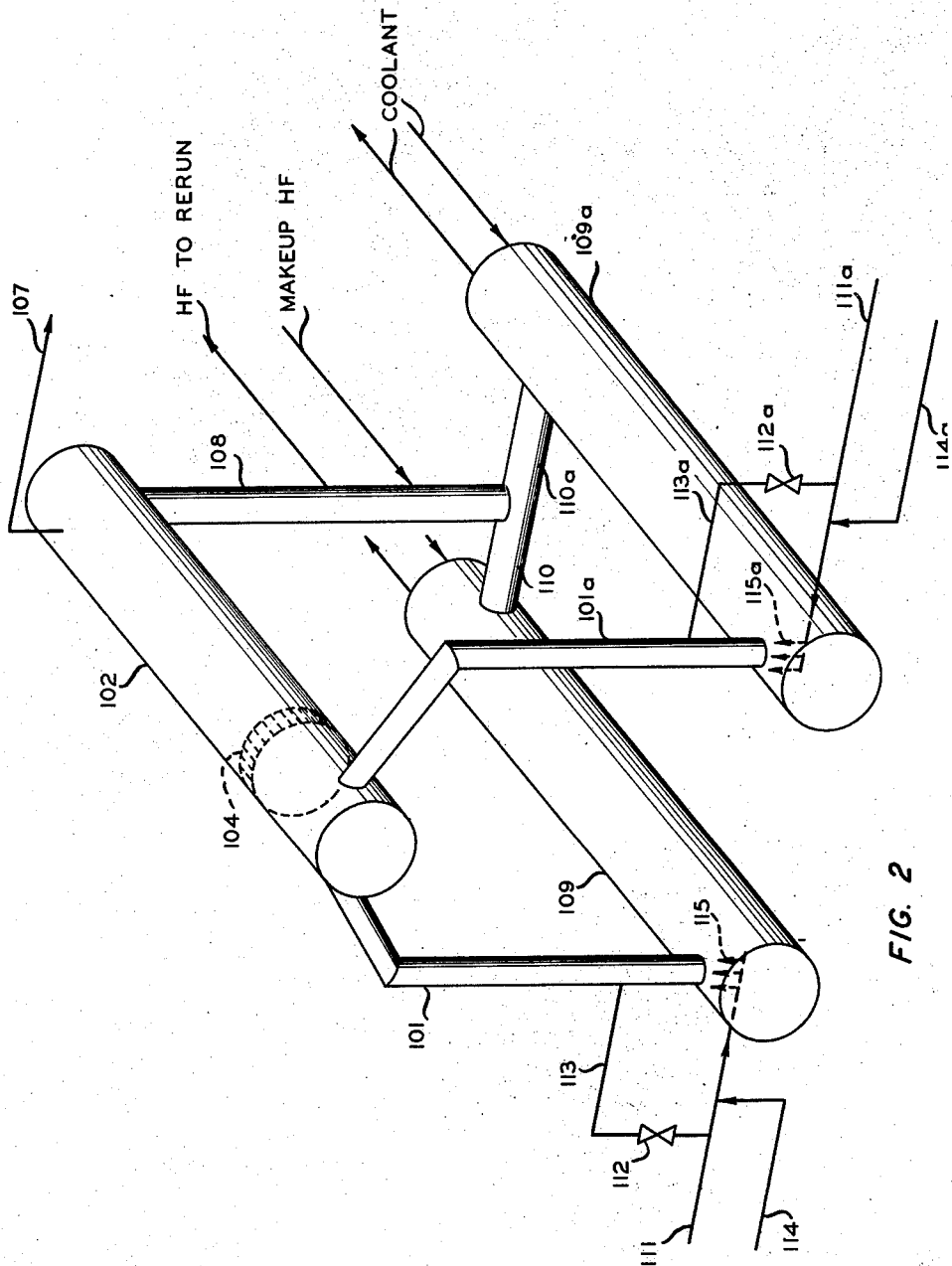
FIGURE 2 illustrates a specific alkylation system for carrying out the process of this invention.

As shown in FIGURE 2, 101 and 101a are vertically elongated tubular reactors which are in open communication at the top with one end of a horizontally elongated settler surge vessel 102. Disposed in the settler and surge vessel, adjacent to the reactor opening is a section 104 containing straightening veins positioned perpendicular (but not normal to) the longitudinal axis of the settler vessel and disposed across the entire cross-section of the vessel. At the opposite end of the settler surge vessel is an outlet conduit 107 provided for the removal of product, said outlet opening in an intermediate region of the vessel. A bottom outlet conduit 108 is provided at the same end of the settler and surge vessel as outlet 107. Outlet 108, which openly communicates with the settler and surge vessel at its upper terminus, is connected at its lower terminus with coolers 109 and 109a through conduits 110 and 110a. Hydrocarbon feed conduits 111 and 111a are provided with nozzles 115 and 115a respectively, in alignment with 101 and 101a, respectively. Conduits 113 and 113a which are provided with valve means 112 and 112a serve as a bypass means to maintain controlled circulation in the reactor leg. Conduit 114 communicates with conduit 111 and serves to introduce the off-specification hydrocarbon material which is to be purified.

In the operation of the apparatus of FIGURE 2 a liquid hydrocarbon feed material comprising an alkylatable hydrocarbon such as a low-boiling olefin and alkylating agent such as low-boiling isoparaffin admixed in suitable proportions and a hydrocarbon containing alkyl fluorides are introduced through conduits 111, 111a, 114 and 114a, respectively, passing upwardly through coolers 109 and 109a and into the bottom of reactors 101 and 101a as a plurality of high-velocity streams of small cross-section. Initially, the reactors and coolers contain a quantity of alkylation catalyst, for example, hydrofluoric acid, such that the level of catalyst extends a substantial distance up into the reactors. The catalyst present in the alkylation system substantially exceeds in quantity the amount of hydrocarbon and therefore constitutes the continuous phase in said system. The hydrocarbon feed entering the reaction zone separates into small droplets which pass upwardly through the reactors 101 and 101a. Acid catalyst present in the reactors and additional catalyst from conduits 110 and 110a, respectively, passes upward through the reactors in co-current flow with the hydrocarbon feed. The simultaneous upward movement of acid and hydrocarbon results from a combination of (1) the kinetic energy of the hydrocarbon feed, and (2) the difference in density of the acid-hydrocarbon mixture in reaction mixtures 101 and 101a as compared to the continuous acid phase in conduit 108. As the acid catalyst and hydrocarbon react and come in contact, reaction between the olefin and isoparaffin occurs with the formation of higher molecular weight materials with increased octane values. In addition, the organic fluorides from the hydrocarbon containing same are removed by the action of the acid catalyst. The reaction being exothermic, the temperature of the acid and reactants increases as the reaction mixture moves upwardly through the reactors.

Within a very short period of time, usually on the order of 1 to 30 seconds, the alkylation reaction is completed, after which reaction effluent containing hydrocarbon product (alkylate), acid catalyst, unreacted feed hydrocarbons and purified feed hydrocarbons passes from the reactor, entering the upstream end of the settler vessel 102. The change in direction and cross-section of flow of the effluent entering the surge vessel causes turbulence in the reaction effluent, which hinders separation of the hydrocarbon and acid into separate phases. To aid in reducing turbulence and shortening the time required for phase separation the effluent is passed through straightening vein section 104 which is positioned in the surge vessel adjacent to point of entry of the effluent. In the vein section the effluent is divided into a plurality of separate parallel streams of limited cross-section in which turbulence is quickly reduced to a minimum. The vein section, which is of limited length compared with overall length of the settler-surge vessel, can be conveniently formed of horizontal plates of suitable construction material, preferably of minimum thickness, suitable to provide the required structural strength. Where more than one straightening vein section is employed these sections can be conveniently provided in the form of a plurality of perforated baffles.

Separation of the alkylation reactant effluent into acid and hydrocarbon phases, which commences with introduction of the reactant effluent to the settler surge vessel, is substantially completed by the time the effluent reaches the opposite end of said vessel. This vessel can be operated liquid full with the use of elevated pressure or it can be operated with both liquid and gas phases at lower pressures, with the provision being made to vent excess gas. The upper phase or hydrocarbon phase is withdrawn from the settler surge vessel through conduit 107 and yielded for further treatment including fractionation as shown in FIGURE 1. The lower, acid phase passes from the settler and surge vessel downwardly through conduit 108 and is divided into substantially equal quantities in conduits 110 and 110a, through which it is introduced to coolers 109 and 109a, respectively. Acid passing through the coolers is reduced in temperature sufficiently to remove heat picked up during the alkylation reaction.

The quantity of acid which is circulated is established by the heat requirements of the alkylation reaction, sufficient acid being circulated to maintain the desired maximum temperature in the alkylation reactor. Specifically, in the alkylation of low-boiling olefins with low-boiling isoparaffins when employing hydrofluoric acid as the alkylation catalyst, the acid circulation rate through each reactor is between 1 and about 8 volumes per volume of hydrocarbon reactant, preferably from 2 to 4 volumes per volume, which provides a temperature gradient in the reactor between about 4 and 15° F. The desired flow rate of acid through the reaction system is obtained in part by imparting the kinetic energy to the hydrocarbons in the reactor. The quantity of kinetic energy present in the flowing hydrocarbon is a function of the velocity of the hydrocarbon in conduits 111 and 111a and through nozzles 115 and 115a which can be controlled by means of by-passes 113 and 113a. The major motive power in the movement of the acid catalyst is the head provided by the difference in density between the acid 108 and the contents of the reactors 101 and 101a and the jetting action of the hydrocarbon feed. This head can be varied by varying the relative elevations of settler and surge vessel 102 and acid coolers 109 and 109a.

The process of this invention provides a desirable method for purifying "off-specification" hydrocarbon material while at the same time carrying out the alkylation reactions. In addition, utilization of the particular apparatus as shown in FIGURE 2 eliminates the pumps and mixers which are usually constructed of expensive alloy materials and which require complicated packing material and seals. In addition by returning to the specification the "off-specification" material according to the method of this invention there is eliminated the necessity of separate handling or treatment of such material. The following example is presented to further illustrate this invention.

Example

Into the alkylation reactor of the type shown in FIGURE 2 is introduced:

| Flows to reactor: | Rate, g.p.m. |
|---|---|
| $C_3$ and $C_4$ olefins | 12.04 |
| Isobutane | 144.46 |
| N-butane (containing 250–5000 p.p.m. of alkyl fluorides) | 0.48 |
| HF | 782.56 |

Reactor temperature—70–90° F.
Residence time in reactor—34 seconds.

| Recovery: | |
|---|---|
| Propane, 50 p.p.m. alkyl fluorides | 2.42 |
| N-butane, 50 p.p.m. alkyl fluorides | 2.40 |
| Alkylate, 20 p.p.m. alkyl fluorides | 139.2 |

Reasonable variations and modifications can be made in accordance with this invention, the essence of which is that there is provided a process for returning "off-specification" materials to the desired properties and more particularly for the removal of organic fluoride compounds from normal hydrocarbons by the subjection of such off-specification materials to the action of hydrofluoric acid while simultaneously carrying out in the same system a conventional alkylation reaction.

I claim:

1. A method for removal of alkyl fluorides from propane and normal butane which comprises introducing said propane and normal butane into a reaction zone wherein isobutane is being alkylated with an olefin in the presence of HF catalyst, subjecting said introduced material to the conditions of alkylation and subsequently recovering the thus purified propane and normal butane free from alkyl fluoride content.

2. A method for removal of alkyl fluorides from propane which comprises introducing said propane into a reaction zone wherein isobutane is being alkylated with an olefin in the presence of HF catalyst, subjecting said introduced material to the conditions of alkylation and subsequently recovering the thus purified propane free from alkyl fluoride content.

3. A method for removal of alkyl fluorides from normal butane which comprises introducing said normal butane into a reaction zone wherein isobutane is being alkylated with an olefin in the presence of HF catalyst, subjecting said introduced material to the conditions of alkylation and subsequently recovering the thus purified normal butane free from alkyl fluoride content.

References Cited by the Examiner
UNITED STATES PATENTS

| 2,448,092 | 8/48 | Gibson | 260—683.48 |
| 2,451,568 | 10/48 | Linn | 260—683.42 |
| 2,463,076 | 3/49 | Zimmerman et al. | 202—71 |
| 2,494,867 | 1/50 | Frey | 260—683.41 |
| 3,066,175 | 11/62 | Bauer et al. | 260—683.48 |

ALPHONSO D. SULLIVAN, *Primary Examiner.*